United States Patent Office 2,820,774
Patented Jan. 21, 1958

2,820,774

VINYL CHLORIDE RESIN WITH LEAD SALT AND HINDERED PHENOL STABILIZERS

Clayton S. Myers, Fanwood, Joseph E. Wilson, New Brunswick, and Robert Bostwick, Somerville, N. J., assignors to Union Carbide Corporation, a corporation of New York No Drawing. Continuation of application Serial No. 261,573, December 13, 1951. This application March 17, 1954, Serial No. 416,946

4 Claims. (Cl. 260—45.75)

Plastic compositions based on polymers or copolymers of vinyl chloride are well established industrial products. The successful utilization of these materials has required the art to develop means to inhibit or delay the blackening or degradation of the vinyl chloride resins which occurs on heating. The more serious degradation of the polymer on severe heating is a partial chemical decomposition caused by the splitting out of hydrogen chloride from the molecule. There are a number of stabilizers in use which are capable of delaying or retarding this chemical decomposition, and many of such stabilizers are basic in character and serve to neutralize the released acid. However, in addition to this primary decomposition, a secondary degradation caused by oxidation or heat may occur which can result in the development of color or odor in the plastic composition, impairment of its strength, elasticity or electrical insulating capacity, or undesirable processing characteristics, such as sticking to the calender rolls or poor heat-sealing properties. The instability of other ingredients of the composition, such as plasticizers, lubricants and dyes, is also a contributing factor to this secondary decomposition.

Some of the better primary stabilizers will also inhibit the secondary type of decomposition, but none are completely satisfactory in this respect particularly with regard to eliminating odors or preventing the development of an initial color on milling the composition to flux the resin and plasticizer. We have discovered a class of auxiliary stabilizers which, when added to a vinyl chloride resin composition containing a primary stabilizer, will greatly retard the development of color and odor on heating the composition. These auxiliary stabilizers are hindered phenols in which all positions ortho or para to a hydroxyl group are substituted by hydrocarbon radicals.

While phenols have been proposed as primary or secondary stabilizers, none of those heretofore suggested have been successful because of their own inherent instability leading to their oxidation to severely colored products. Thus, the addition of such phenols to vinyl chloride resins contributes to the very condition they are designed to correct. Typical of the phenols suggested in the art are phenol, o-phenyl-phenol and o-cresol. On the other hand, the hindered phenols of this invention which are completely substituted in the ortho and para positions do not discolor on heating under the conditions used in this invention, and therefore they are valuable auxiliary stabilizers for the vinyl chloride resins.

The hindered phenols of this invention may be classed in two groups. One group comprises the 2,4,6-trialkyl substituted phenols of the formula:

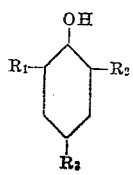

where $R_1$, $R_2$ and $R_3$ are alkyl groups. Preferably the radicals $R_1$ and $R_2$ in the 2 and 6 positions are tertiary alkyl groups whereas the radical $R_3$ may be alkyl or tertiary alkyl. The other group includes 2,2'-methylene bis-4-6-dialkyl phenols of the formula:

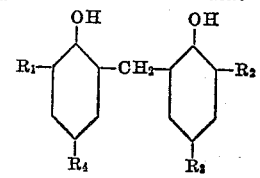

where $R_1$, $R_2$, $R_3$ and $R_4$ are alkyl groups. Preferably the radicals $R_1$ and $R_2$ are tertiary alkyl groups. In both groups of hindered phenols it is preferable that none of the alkyl substituents contain more than four carbon atoms.

Phenols of these types have previously been suggested as anti-oxidant stabilizers for both natural and synthetic rubbers where they serve as primary stabilizers to prevent deterioration of the rubber. For this purpose, they are used in the customary amounts of 1 to 4% of the rubber. On the other hand, the hindered phenols have little or no primary stabilizing action in the customary amounts for vinyl chloride resins, the discoloration of vinyl chloride resins containing no other stabilizer being about the same on heating, with or without the phenols being present. Thus the hindered phenols of this invention are useful solely in combination with any of the known primary stabilizers for vinyl chloride resins where they exert a synergistic effect to increase the over-all effectiveness of the combination. To exert this synergistic effect, only minute amounts of the phenols are required, the useful range being 0.005 to 0.5% by weight of the vinyl chloride resins.

In order to show the synergistic effect of the 2,4,6-substituted phenols on increasing the over-all stability of vinyl chloride resin compositions containing both the phenols and a primary stabilizer, comparative heat stability tests were made on compositions containing only a primary stabilizer and only the phenols. The compositions tested were as follows:

| Formula (parts by weight) | Composition No. | | | |
|---|---|---|---|---|
| | 1 | 2 | 3 | 4 |
| Polyvinyl chloride | 100 | 100 | 100 | 100 |
| Di(2-ethylhexyl)phthalate | 40 | 40 | 40 | 40 |
| Stearic acid | 0.5 | 0.5 | 0.5 | 0.5 |
| Titanium dioxide | 1.0 | 1.0 | 1.0 | 1.0 |
| Lead silicate | 2 | | | |
| 2,6-Di-tert-butyl-4-methylphenol | | 0.1 | 0.2 | 2.0 |

The results of the aging test in an air oven at 158° C. were:

| Composition No. | Percentage Blue Light Reflectance after Heating for— | | | |
|---|---|---|---|---|
| | 0 Hr. | 1.0 Hr. | 1.5 Hrs. | 2.0 Hrs. |
| 1 | 77 | 75 | 54 | 38 |
| 2 | 69 | 37 | 43 | 43 |
| 3 | 69 | 35 | 30 | 29 |
| 4 | 67 | 32 | 27 | 28 |

The results of these tests show that the phenols, by themselves, are not effective as heat stabilizers. The color scale of the tests was determined by the percentage reflectance of blue light on a scale in which 100 represents the reflectance of a white block of magnesium carbonate.

To illustrate the importance of chemical structure in the imparting of stabilizing properties, comparative tests were carried out with the 2,4,6-substituted phenols of this invention and with other substituted phenols. In each instance, the color of the composition containing the phenol after milling for 20 minutes at 170° C. was compared with a control sample formulated and milled in a similar manner but containing no phenol. The color was determined by the percentage reflectance of blue light on the same scale as above described.

The formulas of the stabilized composition and controls were as follows:

Polyvinyl chloride _____ 100 parts.
Di(2-ethylhexyl)phthalate _____ 40 parts.
Lead silicate _____ 2 parts.
Stearic acid _____ 0.5 part.
Titanium dioxide _____ 1.0 part.
Phenolic compound _____ 0.01 part (omitted from control).

The results of the tests were as follows:

| Phenol Compound | Percentage Reflectance after Milling | Change Relative to Control |
| --- | --- | --- |
| Control (no phenol) | 77 | |
| Phenols Substituted other than 2,4,6: | | |
| p-tertiary-amyl phenol | 72 | −5 |
| p-Isopropylphenol | 67 | −10 |
| p-tertiary-amylphenol* | 71 | −6 |
| p-(alpha-phenethyl)phenol* | 69 | −8 |
| 2,4,6-Substituted Phenols: | | |
| 2,4,6-tri-tert-butylphenol | 83 | +6 |
| 2,6-di-tert-butyl-4-methyl-phenol | 82 | +5 |
| 2,2′-methylenebis(4,6-ditert-butyl-phenol) | 80 | +3 |

*Dibutyl tin dilaurate used as stabilizer in place of lead silicate.

It is to be noted that only the 2,4,6-substituted phenols of this invention reduced the color of the stabilized composition on milling, whereas the other phenols caused an increase in color.

The auxiliary phenolic stabilizers of this invention may be used in combination with any primary stabilizer for vinyl chloride resin. The more widely used of such primary stabilizers include the organo-tin compounds, such as dibutyl tin dilaurate and dibutyl tin maleate; lead compounds, such as lead carbonate, tribasic lead sulfate, litharge, lead silicylate, lead maleate, dibasic lead phosphite, dibasic lead phthalate; alkali and alkaline metal salts, such as sodium carbonate, trimagnesium phosphate and calcium stearate; and epoxy compounds, such as glycidyl oleate, the diglycidyl ethers of diphenols, and glycidyl sorbate dimer. A primary stabilizer may be defined as any base-reacting substance which absorbs substantially all of the hydrochloric acid formed by decomposition of the resin and thus prevents the catalytic effect of hydrochloric acid on the various degradation reactions. Furthermore, established tests are available to determine the effectiveness of any compound as a stabilizer for vinyl chloride resins; see ASTM D793–44T "Short-time Stability at Elevated Temperatures of Plastics Containing Chlorine."

A vinyl chloride resin is herein defined as a polymer or copolymer of vinyl chloride in which the vinyl chloride predominates. As is well known in the art, many other substances may be copolymerized with the vinyl chloride, such as vinyl acetate, ethyl and butyl acrylate, dibutyl maleate, diethyl fumarate, vinylidene chloride and acrylonitrile.

The following examples will serve further to illustrate the invention.

*Example 1*

The test samples previously described containing the 2,4,6-substituted phenols were heated for different periods in an oven having access to the air and heated at 138° C. The color of the samples after heating was measured by the blue light reflectance method. The results of the tests were as follows:

| Phenol Added | Percentage Blue Light Reflectance After Oven Heating For— | | | |
| --- | --- | --- | --- | --- |
| | 0 Hr. | 1.0 Hr. | 1.5 Hrs. | 2.0 Hrs. |
| None (control) | 77 | 75 | 54 | 38 |
| 2,4,6-tri-tert-butyl phenol | 83 | 78 | 69 | 59 |
| 2,6-di-tert-butyl-4-methyl phenol | 82 | 82 | 74 | 57 |
| 2,2′-methylenebis(4,6-ditert-butyl phenol) | 80 | 77 | 70 | 60 |

In terms of visual observation, the samples containing the phenols were light cream in color after heating for 1.5 hours, whereas the control sample was a deep, chocolate brown.

*Example 2*

As previously mentioned, the 2,4,6-substituted phenols of this invention also act to prevent the development of strong odors in stabilized plastic compositions. To illustrate this property, a base composition was prepared as a control having the following formula:

Parts
Copolymer of vinyl chloride and vinyl acetate 95% vinyl chloride _____ 400
Di(2-ethylhexyl)phthalate _____ 324
Tribasic lead sulfate, $PbSO_4 \cdot 3PbO$ _____ 23
Calcium stearate _____ 5.6
Stearic acid _____ 3

Similar compositions were also prepared which contained in addition 0.4 part respectively of 2,6-di-tert-butyl-4-methyl phenol and of 2,2′-methylenebis(4,6-ditertiarybutylphenol). Each composition was milled for 15 minutes at 170° C., and then removed from the mill as sheet 40 mils in thickness. Each sheet was cut into thin strips and stored in a tightly closed gallon jar. After three days, the three jars were opened and it was observed that the control sample had developed a strong, penetrating odor, while the samples containing the phenols had only a mild odor which was very faint and unobjectionable in character.

The invention is not restricted to plastic compositions containing di(2-ethylhexyl)phthalate and is broadly useful in improving the color and odor of vinyl chloride resins containing other plasticizers, such as monomeric or polymeric esters of mono and difunctional acids and alcohols; esters of mono and difunctional acids and ether-alcohols, such as di(butoxyethyl)phthalate; epoxy compounds, such as glycidyl oleate and epoxidized soy bean oil; esters of alcohols and phosphoric acid, such as tri(2-ethylhexyl)phosphate and diphenyl mono-octyl phosphate.

This application is a continuation of Serial No. 261,573, filed December 13, 1951, now abandoned.

What is claimed is:

1. A plastic composition stabilized against both chemical decomposition and the development of color and odor on heating which comprises a vinyl chloride resin, a lead salt stabilizer for the vinyl chloride resin, and an auxiliary stabilizer in an amount between 0.005 to 0.5% by weight of the vinyl chloride resin, said auxiliary stabilizer being a 2,4,6-trialkyl substituted phenol in which the alkyl substituents in the 2,6-position are tertiary butyl radicals, and the alkyl group in the 4-position contains up to four carbon atoms.

2. A plastic composition stabilized against both chemical decomposition and the development of color and odor on heating comprising polyvinyl chloride, a lead silicate stabilizer and from 0.005 to 0.5% by weight of the polyvinyl chloride of 2,4,6-tri-tert-butylphenol.

3. A plastic composition stabilized against both chemical decomposition and the development of color and odor on heating comprising polyvinyl chloride, a lead silicate stabilizer and from 0.005 to 0.5% by weight of the polyvinyl chloride of 2,6-di-tert-butyl-4-methylphenol.

4. A plastic composition stabilized against both chemical decomposition and the development of color and odor on heating comprising polyvinyl chloride, a lead silicate stabilizer and from 0.005 to 0.5% by weight of the polyvinyl chloride of 2,2'-methylenebis(4,6-ditert-butylphenol).

References Cited in the file of this patent
UNITED STATES PATENTS 2,564,646     Leistner et al. _____ Aug. 14, 1951